(12) United States Patent
Zhang et al.

(10) Patent No.: US 11,984,745 B1
(45) Date of Patent: May 14, 2024

(54) MONITORING SYSTEM AND MONITORING METHOD FOR OPERATION OF ENERGY STORAGE SYSTEM

(71) Applicant: Guizhou University, Guizhou (CN)

(72) Inventors: Jing Zhang, Guizhou (CN); Peijia Yu, Guizhou (CN); Luqin Fan, Guizhou (CN); Benjin Long, Guizhou (CN); Rujing Yan, Guizhou (CN)

(73) Assignee: Guizhou University, Guiyang (CN)

( * ) Notice: Subject to any disclaimer, the term of this patent is extended or adjusted under 35 U.S.C. 154(b) by 0 days.

(21) Appl. No.: 18/520,690

(22) Filed: Nov. 28, 2023

(30) Foreign Application Priority Data

Dec. 7, 2022 (CN) .......................... 202211561786.5

(51) Int. Cl.
*H02J 7/00* (2006.01)
*H02J 3/06* (2006.01)
(Continued)

(52) U.S. Cl.
CPC ............ *H02J 7/005* (2020.01); *H02J 7/0048* (2020.01); *H02J 13/00002* (2020.01); *H02J 3/06* (2013.01); *H02J 3/32* (2013.01)

(58) Field of Classification Search
CPC .... H02J 7/005; H02J 7/0048; H02J 13/00002; H02J 3/06; H02J 3/32
(Continued)

(56) References Cited

U.S. PATENT DOCUMENTS 8,493,023 B2 * 7/2013 Hsieh ................ H02J 7/007182
320/140
9,056,556 B1 * 6/2015 Hyde ...................... B60L 58/20
(Continued)

FOREIGN PATENT DOCUMENTS

CN 109739439 A 5/2019
CN 113049962 A 6/2021
(Continued)

OTHER PUBLICATIONS

CNIPA, Notification of First Office Action for CN202211561786.5, dated Jun. 13, 2023.
(Continued)

*Primary Examiner* — John T Trischler

(57) ABSTRACT

A monitoring system and method for operation of energy storage system are provided, the system includes a collection module, configured to collect operation data of the energy storage system; a predictive module, configured to predict the operation data to obtain predictive data of future development trend of the energy storage system; a processing module, configured to process the operation data and the predictive data to obtain an operation state of battery packs in the energy storage system; a storage module, configured to store the operation data, the predictive data and the operation state of the battery packs; and an evaluation module, configured to evaluate an operation state of the energy storage system according to operation data, predictive data and the operation state of the battery packs. The energy storage system is monitored, and the operation state of the energy storage system is evaluated by combining with power grid dispatch instructions.

6 Claims, 2 Drawing Sheets

(51) Int. Cl.
*H02J 3/32* (2006.01)
*H02J 13/00* (2006.01)

(58) Field of Classification Search
USPC .......................................................... 320/134
See application file for complete search history.

(56) References Cited

U.S. PATENT DOCUMENTS

| | | | | |
|---|---|---|---|---|
| 9,079,505 | B1* | 7/2015 | Hyde | G08G 1/202 |
| 9,297,859 | B2* | 3/2016 | Mukaitani | G01R 31/389 |
| 9,453,885 | B2* | 9/2016 | Mukaitani | G01R 31/382 |
| 9,459,323 | B2* | 10/2016 | Mukaitani | G01R 31/3842 |
| 9,660,450 | B2* | 5/2017 | Li | H02S 50/00 |
| 9,841,464 | B2* | 12/2017 | Kise | H01M 10/42 |
| 9,878,631 | B2* | 1/2018 | Hyde | B60L 1/14 |
| 9,960,637 | B2* | 5/2018 | Sanders | H02J 15/00 |
| 10,055,911 | B2* | 8/2018 | Luke | G06F 3/0671 |
| 10,203,375 | B2* | 2/2019 | Hongo | G01R 31/367 |
| 10,215,813 | B2* | 2/2019 | Mukaitani | H02J 7/005 |
| 10,787,092 | B2* | 9/2020 | Hou | H02J 7/0013 |
| 10,879,708 | B2* | 12/2020 | Belkacem-Boussaid | H02J 7/005 |
| 11,110,813 | B2* | 9/2021 | Hou | B60L 53/35 |
| 11,334,036 | B2* | 5/2022 | Yang | H02J 3/32 |
| 11,374,418 | B2* | 6/2022 | Molchadsky | H02J 7/00032 |
| 11,393,307 | B2* | 7/2022 | Molchadsky | G01R 31/36 |
| 11,635,467 | B2* | 4/2023 | Ukumori | H01M 10/48 702/63 |
| 2011/0025276 | A1* | 2/2011 | Hsieh | H02J 7/007182 320/148 |
| 2011/0175566 | A1* | 7/2011 | Hsieh | H02J 7/007182 320/162 |
| 2013/0026972 | A1* | 1/2013 | Luke | B60L 55/00 320/167 |
| 2014/0049229 | A1* | 2/2014 | Li | H02P 11/06 322/39 |
| 2014/0285156 | A1* | 9/2014 | Mukaitani | G01R 31/392 320/134 |
| 2014/0306667 | A1* | 10/2014 | Mukaitani | G01R 31/392 324/426 |
| 2014/0312915 | A1* | 10/2014 | Mukaitani | G01R 31/382 324/434 |
| 2015/0239365 | A1* | 8/2015 | Hyde | B60L 58/26 701/2 |
| 2015/0323611 | A1* | 11/2015 | Kise | H02J 7/005 702/63 |
| 2016/0218511 | A1* | 7/2016 | Li | H02S 50/00 |
| 2016/0356856 | A1* | 12/2016 | Hongo | G01R 31/392 |
| 2017/0005515 | A1* | 1/2017 | Sanders | H02J 3/388 |
| 2017/0350946 | A1* | 12/2017 | Mukaitani | H01M 10/486 |
| 2018/0026454 | A1* | 1/2018 | Belkacem-Boussaid | H02J 7/0019 702/63 |
| 2018/0134171 | A1* | 5/2018 | Hyde | B60L 3/12 |
| 2019/0280493 | A1* | 9/2019 | Belkacem-Boussaid | H02J 7/005 |
| 2020/0086754 | A1* | 3/2020 | Hou | H02J 7/0042 |
| 2020/0215927 | A1* | 7/2020 | Hou | H02J 7/0045 |
| 2021/0003974 | A1* | 1/2021 | Yang | G05B 13/027 |
| 2021/0005066 | A1* | 1/2021 | Molchadsky | G01R 31/36 |
| 2021/0336460 | A1* | 10/2021 | Molchadsky | H01M 10/4257 |
| 2022/0224121 | A1* | 7/2022 | Jha | G05B 13/0265 |
| 2022/0299569 | A1* | 9/2022 | Kurtz | G01R 31/392 |
| 2022/0381831 | A1* | 12/2022 | Ukumori | H02J 13/00002 |
| 2023/0207905 | A1* | 6/2023 | Yan | H01M 10/482 |
| 2023/0208178 | A1* | 6/2023 | Yan | H01M 10/46 |
| 2023/0211667 | A1* | 7/2023 | Cronin | B60L 50/64 320/109 |
| 2023/0276365 | A1* | 8/2023 | Droste | H02J 7/0042 307/9.1 |
| 2023/0327468 | A1* | 10/2023 | Zhang | H02J 7/00712 |

FOREIGN PATENT DOCUMENTS

| | | | | |
|---|---|---|---|---|
| CN | 114548809 | A | 5/2022 | |
| EP | 2985851 | A1* | 2/2016 | H01M 10/425 |

OTHER PUBLICATIONS

Guizhou University (Applicant), Reply to Notification of First Office Action for CN202211561786.5, w/ replacement claims, dated Jul. 11, 2023.

Guizhou University (Applicant), Supplemental Reply to Notification of First Office Action for CN202211561786.5, w/ (allowed) replacement claims, dated Aug. 2, 2023.

CNIPA, Notification to grant patent right for invention in CN202211561786.5, dated Aug. 11, 2023.

* cited by examiner

Obtaining operation data of an energy storage system

Predicting the operation data to obtain predictive data of a future development trend of the energy storage system Processing the operation data and the predictive data to obtain an operation state of a battery pack in the energy storage system Evaluating an operation state of the energy storage system according to the operation data, the predictive data and the operation state of the battery pack

FIG. 2

MONITORING SYSTEM AND MONITORING METHOD FOR OPERATION OF ENERGY STORAGE SYSTEM

TECHNICAL FIELD

The disclosure relates to the field of electric power energy storage monitoring technologies, and more particularly to a monitoring system and a monitoring method for operation of an energy storage system.

BACKGROUND

An energy storage system is generally composed of an energy storage converter and a battery pack, the energy storage system can quickly respond to a change of power grid load and adjust power of an access point, and the energy storage system is widely used in an electric power system.

The energy storage system plays a role in the following aspects. (1) The energy storage system can charge and store energy during low load electricity usage at night, and discharge during high load electricity usage during the day, thus alleviating pressure on a power grid during the day, playing a role in peak-cutting and valley-filling, and achieving economic electricity consumption. (2) The energy storage system serves as an emergency power source when the power grid is interrupted for a short period of time or power quality is low, thus ensuring a power supply of critical units such as data centers, hospitals and banks. (3) The energy storage systems can be combined with a converter technology in power electronics to better regulate active power, control reactive power, quickly balance power imbalances caused by various reasons in the electric power system, reduce impact of disturbances on the power grid, and improve the power quality. (4) The energy storage systems can be combined with clean energy sources such as photovoltaic/wind power to establish a wind and solar energy storage system, so as to save energy and reduce emissions, and promote low-carbon economic to develop.

An application market of a research and development achievement of the energy storage system is wide, and technological advantages of the energy storage system make it irreplaceable in solving problems of urban power shortage and huge peak shaving pressure on the power grid, large-scale grid connection of clean energy generation, and a rapid development of electric vehicle charging facilities. However, at present, a monitoring of the energy storage systems is only a data monitoring of the energy storage converter and the battery pack, and it is not possible to directly obtain an overall operation state of the energy storage system and an overall operation relationship with power grid dispatch instructions, and additional manpower and material resources are needed to evaluate the energy storage system, therefore, it is necessary to establish a sound energy storage monitoring system.

SUMMARY

In order to solve the above technical problems, the disclosure provides a monitoring system and a monitoring method for operation of an energy storage system to comprehensively monitor the energy storage system, and the monitoring system is combined with a power grid dispatch instruction to evaluate an operation state of the energy storage system.

On the one hand, in order to achieve the above purposes, the disclosure provides a monitoring system for operation of the energy storage system, and the monitoring system includes: a collection module, a predictive module, a storage module, a processing module and an evaluation module. The collection module is configured to collect operation data of the energy storage system; the predictive module is configured to predict the operation data to obtain predictive data of a future development trend of the energy storage system; the processing module is configured to process the operation data and the predictive data to obtain an operation state of a battery pack in the energy storage system; the storage module is configured to store the operation data, the predictive data and the operation state of the battery pack; and the evaluation module is configured to evaluate an operation state of the energy storage system according to the operation data, the predictive data and the operation state of the battery pack.

In an embodiment, the collection module includes a first collection unit and a second collection unit. The first collection unit is configured to collect battery pack data and converter data of the energy storage system, and the battery pack data includes a voltage, a current, a temperature, impedance and a number of charge and discharge of the battery pack; and the second collection unit is configured to collect a first power grid dispatch instruction corresponding to the energy storage system.

In an embodiment, the monitoring system further includes a setting module, and the setting module includes a storage sub-unit, a state collection unit and a sending unit. The state collection unit is configured to collect the operation state of the energy storage system, and the operation state includes a shutdown state, a standby state and a charging and discharging working state; the storage sub-unit is configured to store preset collection frequencies, the collection frequencies include a first frequency, a second frequency and a third frequency, the first frequency is large than the second frequency, and the second frequency is large than the third frequency; and the sending unit is configured to send, in response to the operation state of the energy storage system being the charging and discharging working state, the first frequency to the collection module, send, in response to the operation state of the energy storage system being the standby state, the second frequency to the collection module, and send, in response to the operation state of the energy storage system being the shutdown state, the third frequency to the collection module.

In an embodiment, the predictive module includes a construction unit, a training unit and an output unit. The construction unit is configured to construct a predictive model according to a long short term memory (LSTM) neural network; the training unit is configured to train the predictive model according to historical operation data of the energy storage system to obtain a trained predictive model; and the output unit is configured to input the operation data collected by the first collection unit to the trained predictive model to obtain the predictive data of the future development trend of the energy storage system.

In an embodiment, the processing module includes a first processing unit and a second processing unit. The first processing unit is configured to obtain a real-time state of charge and a real-time health state of the energy storage system according to the operation data collected by the first collection unit; and the second processing unit is configured to obtain a predictive state of charge and a predictive health state of the energy storage system within some time to come according to the predictive data obtained by the predictive module.

In an embodiment, the evaluation module includes a first evaluation unit and a second evaluation unit. The first evaluation unit is configured to evaluate the operation state of the energy storage system in real-time according to the real-time state of charge, the real-time health state and the power grid dispatch instruction; and the second evaluation unit is configured to predict and evaluate the operation state of the energy storage system according to the predictive state of charge, the predictive health state and a future power grid dispatch instruction (i.e., a second power grid dispatch instruction), and the future power grid dispatch instruction is obtained based on a historical power grid dispatch instruction at a same time.

In an exemplary embodiment, each of the collection module, the predictive module, the storage module, the processing module, the evaluation module, the setting module, the first collection unit, the second collection unit, the storage sub-unit, the state collection unit, the sending unit, the construction unit, the training unit, the output unit, the first processing unit, the second processing unit, the first evaluation unit and the second evaluation unit are embodied by software stored in at least one memory and executable by at least one processor.

In an embodiment, the first evaluation unit configured to evaluate the operation state of the energy storage system in real-time is specifically configured to:
   determine, based on the real-time state of charge and the real-time health state, whether the energy storage system satisfies the power grid dispatch instruction;
   send, in response to the energy storage system satisfying the first power grid dispatch instruction, a message indicating compliance, and send the real-time state of charge and the real-time health state to a power grid dispatch system; and
   send, in response to the energy storage system falling to satisfy the first power grid dispatch instruction, a warning message.

In an embodiment, the second evaluation unit configured to predict and evaluate the operation state of the energy storage system is specifically configured to:
   determine, based on the predictive state of charge and the predictive health state, whether the energy storage system satisfies the future power grid dispatch instruction;
   send, in response to the energy storage system satisfies the future power grid dispatch instruction, the message indicating compliance, and send the predictive state of charge and the predictive health state to the power grid dispatch system; and
   send, in response to the energy storage system failing to satisfy the second power grid dispatch instruction, the warning message.

On the other hand, in order to achieve the above purposes, the disclosure further provides a monitoring method for operation of the energy storage system, and the monitoring method includes:
   obtaining the operation data of the energy storage system; where the operation data includes the battery pack data, the converter data and the first power grid dispatch instruction;
   predicting the operation data to obtain the predictive data of the future development trend of the energy storage system;
   processing the operation data and the predictive data to obtain the operation state of the battery pack in the energy storage system; and
   evaluating the operation state of the energy storage system according to the operation data, the predictive data and the operation state of the battery pack.

In an exemplary embodiment, the monitoring method further includes: obtaining an evaluation result by evaluating the operation state of the energy storage system, and outputting the evaluation result to the power grid dispatch system, to thereby make the power grid dispatch system dispatch electric power.

In an exemplary embodiment, the monitoring method further includes: obtaining an evaluation result by evaluating the operation state of the energy storage system, and adjusting, based on the evaluation result, the energy storage system.

In an embodiment, the monitoring method further includes:
   collecting the operation state of the energy storage system; where the operation state includes: the shutdown state, the standby state and the charging and discharging working state;
   presetting the collection frequencies; where the collection frequencies include: the first frequency, the second frequency and the third frequency, the first frequency is large than the second frequency, and the second frequency is large than the third frequency; and
   sending the first frequency in response to the operation state of the energy storage system being the charging and discharging working state;
   sending the second frequency in response to the operation state of the energy storage system being the standby state; and
   sending the third frequency in response to the operation state of the energy storage system being the shutdown state.

Compared to the related art, the disclosure has the following advantages and technical effects.

Different monitoring frequencies of different states are set in the disclosure, which can effectively reduce monitoring data volumes, save energy and transmission resources, accelerate data processing, and make monitoring effects more real-time and accurate; the monitoring system and method in the disclosure can obtain the state of charge and the health state of the battery pack in the energy storage system in real-time, and monitor the energy storage system in real-time, the predictive module is configured to predict the data of the future development trend of the energy storage system, which can perform an advance adjustment and preventive treatment on the energy storage system according to the predictive data, avoid serious problems with the energy storage system, and make the monitoring of the energy storage system more comprehensive, and the operation state data of the energy storage system monitored by the monitoring system can be reflected to the power grid dispatch system to provide decision data for power grid dispatch.

BRIEF DESCRIPTION OF DRAWINGS

Drawings forming a part of the disclosure are used to provide a further understanding of the disclosure, embodiments and descriptions of the disclosure are used to describe the disclosure and do not constitute an improper limitation of the disclosure.

FIG. 2 illustrates a flowchart of a monitoring method for operation of the energy storage system according to an embodiment 2 of the disclosure.

DETAILED DESCRIPTION OF EMBODIMENTS

Figure 1:
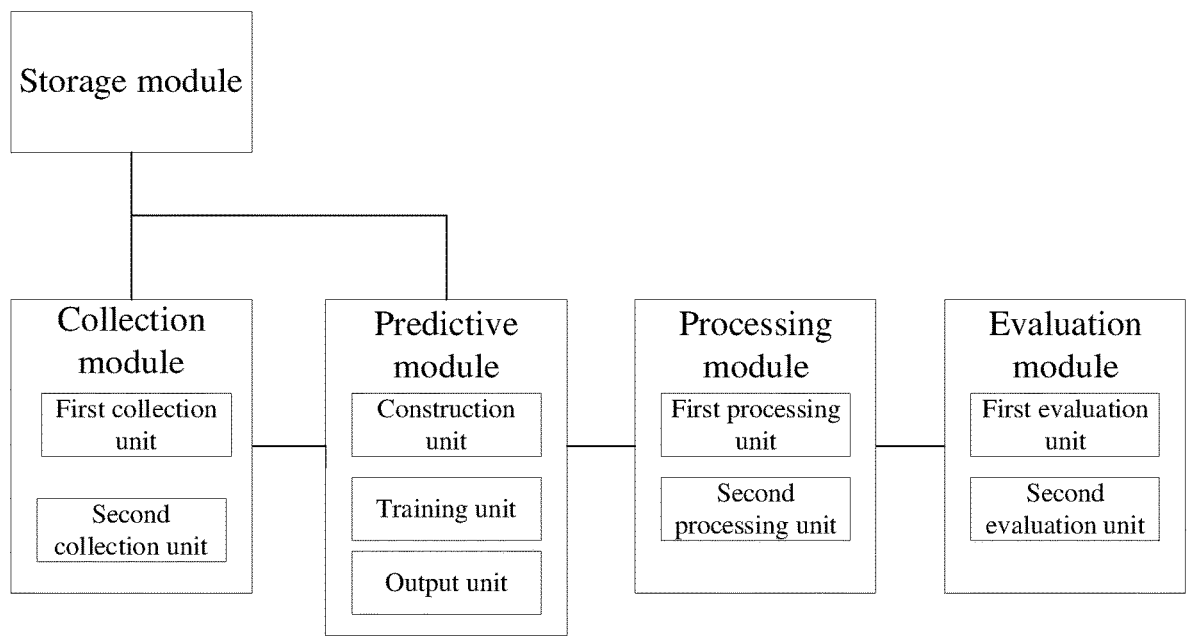
FIG. 1 illustrates a schematic structural diagram of a monitoring system for operation of an energy storage system according to an embodiment 1 of the disclosure.

It should be noted that in a situation without conflict, embodiments and features in the embodiments of the disclosure can be combined with each other. The disclosure is described in detail by combining drawings and the embodiments.

It should be noted that steps shown in a flowchart in the drawings can be executed in a computer system with a set of computer executable instructions, although a logical order is shown in the flowchart, in some cases, the steps shown or described can be executed in a different order than here.

Embodiment 1

As shown in FIG. 1, the embodiment provides a monitoring system for operation of an energy storage system, the monitoring system includes: a collection module, a predictive module, a storage module, a processing module and an evaluation module. The collection module is configured to collect operation data of the energy storage system; the predictive module is configured to predict the operation data to obtain predictive data of a future development trend of the energy storage system; the processing module is configured to process the operation data and the predictive data to obtain an operation state of a battery pack in the energy storage system; the storage module is configured to store the operation data, the predictive data and the operation state of the battery pack; and the evaluation module is configured to evaluate an operation state of the energy storage system according to the operation data, the predictive data and the operation state of the battery pack.

In an embodiment, the collection module includes a first collection unit and a second collection unit. The first collection unit is configured to collect battery pack data and converter data of the energy storage system, and the battery pack data includes a voltage, a current, a temperature, impedance and a number of charge and discharge of the battery pack; and the second collection unit is configured to collect a first power grid dispatch instruction corresponding to the energy storage system.

In an embodiment, the monitoring system further includes a setting module, and the setting module includes a storage sub-unit, a state collection unit and a sending unit. The state collection unit is configured to collect the operation state of the energy storage system, and the operation state includes a shutdown state, a standby state and a charging and discharging working state; the storage sub-unit is configured to store preset collection frequencies, the collection frequencies include a first frequency, a second frequency and a third frequency, the first frequency is large than the second frequency, and the second frequency is large than the third frequency; and the sending unit is configured to send, in response to the operation state of the energy storage system being the charging and discharging working state, the first frequency to the collection module, send, in response to the operation state of the energy storage system being the standby state, the second frequency to the collection module, and send, in response to the operation state of the energy storage system being the shutdown state, the third frequency to the collection module.

In the embodiment, it is not necessary to collect the operation data of the energy storage system at all times through setting data state collection, the collection frequency is increased in the charging and discharging working state, which can provide a more intensive understanding of a state of the energy storage system during charging and discharging operations, and the state of the energy storage state during the charging and discharging operations is a section that needs to be closely monitored due to rapid state changes; in the shutdown state, it does not require too much monitoring frequency due to a stability state of the energy storage system; and different monitoring frequencies for different states can effectively reduce monitoring data volumes, save energy and transmission resources, accelerate data processing, and make monitoring effects more real-time and accurate.

In an embodiment, the predictive module includes a construction unit, a training unit and an output unit. The construction unit is configured to construct a predictive model according to a long short term memory (LSTM) neural network; the training unit is configured to train the predictive model according to historical operation data of the energy storage system to obtain a trained predictive model; and the output unit is configured to input the operation data collected by the first collection unit to the trained predictive model to obtain the predictive data of the future development trend of the energy storage system.

In the embodiment, the predictive module is configured to predict the data of the future development trend of the energy storage system, which can perform an advance adjustment and preventive treatment on the energy storage system according to the predictive data, avoid serious problems with the energy storage system, and make the monitoring of the energy storage system more comprehensive.

In an embodiment, the processing module includes a first processing unit and the second processing unit. The first processing unit is configured to obtain a real-time state of charge and a real-time health state of the energy storage system according to the operation data collected by the first collection unit; and the second processing unit is configured to obtain a predictive state of charge and a predictive health state of the energy storage system within some time to come according to the predictive data obtained by the predictive module.

In an embodiment, the evaluation module includes a first evaluation unit and a second evaluation unit. The first evaluation unit is configured to evaluate the operation state of the energy storage system in real-time according to the real-time state of charge, the real-time health state and the first power grid dispatch instruction; and the second evaluation unit is configured to predict and evaluate the operation state of the energy storage system according to the predictive state of charge, the predictive health state and a future power grid dispatch instruction (i.e., a second power grid dispatch instruction), and the future power grid dispatch instruction is obtained based on a historical power grid dispatch instruction at a same time.

In an embodiment, the first evaluation unit configured to evaluate the operation state of the energy storage system in real-time is specifically configured to determine, based on the real-time state of charge and the real-time health state, whether the energy storage system satisfies the power grid dispatch instruction; send, in response to the energy storage system satisfying the power grid dispatch instruction, a message indicating compliance, and send the real-time state of charge and the real-time health state to a power grid dispatch system; and send, in response to the energy storage system failing to satisfy the first power grid dispatch instruction, a warning message.

In an embodiment, the second evaluation unit configured to predict and evaluate the operation state of the energy storage system is specifically configured to determine, based on the predictive state of charge and the predictive health state, whether the energy storage system satisfies the future power grid dispatch instruction; send, in response to the energy storage system satisfying the future power grid dispatch instruction, the message indicating compliance, and send the predictive state of charge and the predictive health state to the power grid dispatch system; and send, in response to the energy storage system failing to satisfy the first power grid dispatch instruction, the warning message.

In the embodiment, a data connection is performed on the monitoring system and the power grid dispatch system, the operation state data of the energy storage system monitored by the monitoring system can be reflected to the power grid dispatch system to provide decision data for power grid dispatch.

Embodiment 2

As shown in FIG. 2, the embodiment provides a monitoring method for operation of the energy storage system, the monitoring method includes the following steps. The operation data of the energy storage system is obtained, and the operation data includes the battery pack data, the converter data and the first power grid dispatch instruction; the operation data is predicted to obtain the predictive data of the future development trend of the energy storage system; the operation data and the predictive data is processed to obtain the operation state of the battery pack in the energy storage system; and the operation state of the energy storage system is evaluated according to the operation data, the predictive data and the operation state of the battery pack.

In an embodiment, the monitoring method further includes the following steps. The operation state of the energy storage system is collected, and the operation state includes the shutdown state, the standby state and the charging and discharging working state; the collection frequencies is preset, and the collection frequencies include the first frequency, the second frequency and the third frequency, the first frequency is large than the second frequency, and the second frequency is large than the third frequency; the first frequency is sent in response to the operation state of the energy storage system being the charging and discharging working state, the second frequency is sent in response to the operation state of the energy storage system being the standby state, and the third frequency is sent in response to the operation state of the energy storage system being the shutdown state.

The above is merely embodiments of the disclosure, a scope of protection of the disclosure is not limited to this, any changes or replacements that can easily be imagined by those skilled in the art within a scope of disclosure should be covered within the scope of protection of the disclosure. Therefore, the scope of protection of the disclosure should be based on a scope of protection of claims.

What is claimed is:

1. A monitoring system for operation of an energy storage system, comprising:
 a collection module, configured to collect operation data of the energy storage system; wherein the collection module comprises:
  a first collection unit, configured to collect battery pack data and converter data of the energy storage system; wherein the battery pack data comprises a voltage, a current, a temperature, impedance and a number of charge and discharge of a battery pack; and
  a second collection unit, configured to collect a first power grid dispatch instruction corresponding to the energy storage system;
 a predictive module, configured to predict the operation data to obtain predictive data of a future development trend of the energy storage system;
 a processing module, configured to process the operation data and the predictive data to obtain an operation state of the battery pack in the energy storage system; wherein the processing module comprises:
  a first processing unit, configured to obtain a real-time state of charge and a real-time health state of the energy storage system according to the battery pack data and the converter data collected by the first collection unit; and
  a second processing unit, configured to obtain a predictive state of charge and a predictive health state of the energy storage system according to the predictive data obtained by the predictive module;
 a storage module, configured to store the operation data, the predictive data and the operation state of the battery pack;
 an evaluation module, configured to evaluate an operation state of the energy storage system according to the operation data, the predictive data and the operation state of the battery pack; wherein the evaluation module comprises:
  a first evaluation unit, configured to evaluate the operation state of the energy storage system in real-time according to the real-time state of charge, the real-time health state and the first power grid dispatch instruction; and
  a second evaluation unit, configured to predict and evaluate the operation state of the energy storage system according to the predictive state of charge, the predictive health state and a second power grid dispatch instruction; wherein the second power grid dispatch instruction is obtained based on a historical power grid dispatch instruction at a same time; and
 wherein the monitoring system further comprises a setting module; and the setting module comprises:
  a state collection unit, configured to collect the operation state of the energy storage system; wherein the operation state comprises: a shutdown state, a standby state and a charging and discharging working state;
  a storage sub-unit, configured to store preset collection frequencies; wherein the collection frequencies comprise: a first frequency, a second frequency and a third frequency, the first frequency is large than the second frequency, and the second frequency is large than the third frequency; and
  a sending unit, configured to send, in response to the operation state of the energy storage system being the charging and discharging working state, the first frequency to the collection module, send, in response to the operation state of the energy storage system being the standby state, the second frequency to the collection module, and send, in response to the operation state of the energy storage system being the shutdown state, the third frequency to the collection module.

2. The monitoring system for operation of the energy storage system as claimed in claim 1, wherein the predictive module comprises:

a construction unit, configured to construct a predictive model according to a long short term memory (LSTM) neural network;

a training unit, configured to train the predictive model according to historical operation data of the energy storage system to obtain a trained predictive model; and an output unit, configured to input the operation data collected by the first collection unit to the trained predictive model to obtain the predictive data of the future development trend of the energy storage system.

3. The monitoring system for operation of the energy storage system as claimed in claim 1, wherein the first evaluation unit configured to evaluate the operation state of the energy storage system in real-time is specifically configured to:

determine, based on the real-time state of charge and the real-time health state, whether the energy storage system satisfies the first power grid dispatch instruction;

send, in response to the energy storage system satisfying the first power grid dispatch instruction, a message indicating compliance, and send the real-time state of charge and the real-time health state to a power grid dispatch system; and send, in response to the energy storage system failing to satisfy the first power grid dispatch instruction, a warning message.

4. The monitoring system for operation of the energy storage system as claimed in claim 1, wherein the second evaluation unit configured to predict and evaluate the operation state of the energy storage system is specifically configured to:

determine, based on the predictive state of charge and the predictive health state, whether the energy storage system satisfies the second power grid dispatch instruction;

send, in response to the energy storage system satisfying the second power grid dispatch instruction, a message indicating compliance, and send the predictive state of charge and the predictive health state to a power grid dispatch system; and send, in response to the energy storage system failing to satisfy the second power grid dispatch instruction, a warning message.

5. A monitoring method for operation of the energy storage system, applying the monitoring system as claimed in claim 1, wherein the monitoring method comprises:

obtaining the operation data of the energy storage system; wherein the operation data comprises the battery pack data, the converter data and the first power grid dispatch instruction;

predicting the operation data to obtain the predictive data of a future development trend of the energy storage system;

processing the operation data and the predictive data to obtain the operation state of the battery pack in the energy storage system; and evaluating the operation state of the energy storage system according to the operation data, the predictive data and the operation state of the battery pack.

6. The monitoring method for operation of the energy storage system as claimed in claim 5, wherein the monitoring method further comprises:

collecting the operation state of the energy storage system; wherein the operation state comprises: the shutdown state, the standby state and the charging and discharging working state;

presetting the collection frequencies; wherein the collection frequencies comprise: the first frequency, the second frequency and the third frequency, the first frequency is large than the second frequency, and the second frequency is large than the third frequency; and sending the first frequency in response to the operation state of the energy storage system being the charging and discharging working state;

sending the second frequency in response to the operation state of the energy storage system being the standby state; and sending the third frequency in response to the operation state of the energy storage system being the shutdown state.

* * * * *